UNITED STATES PATENT OFFICE.

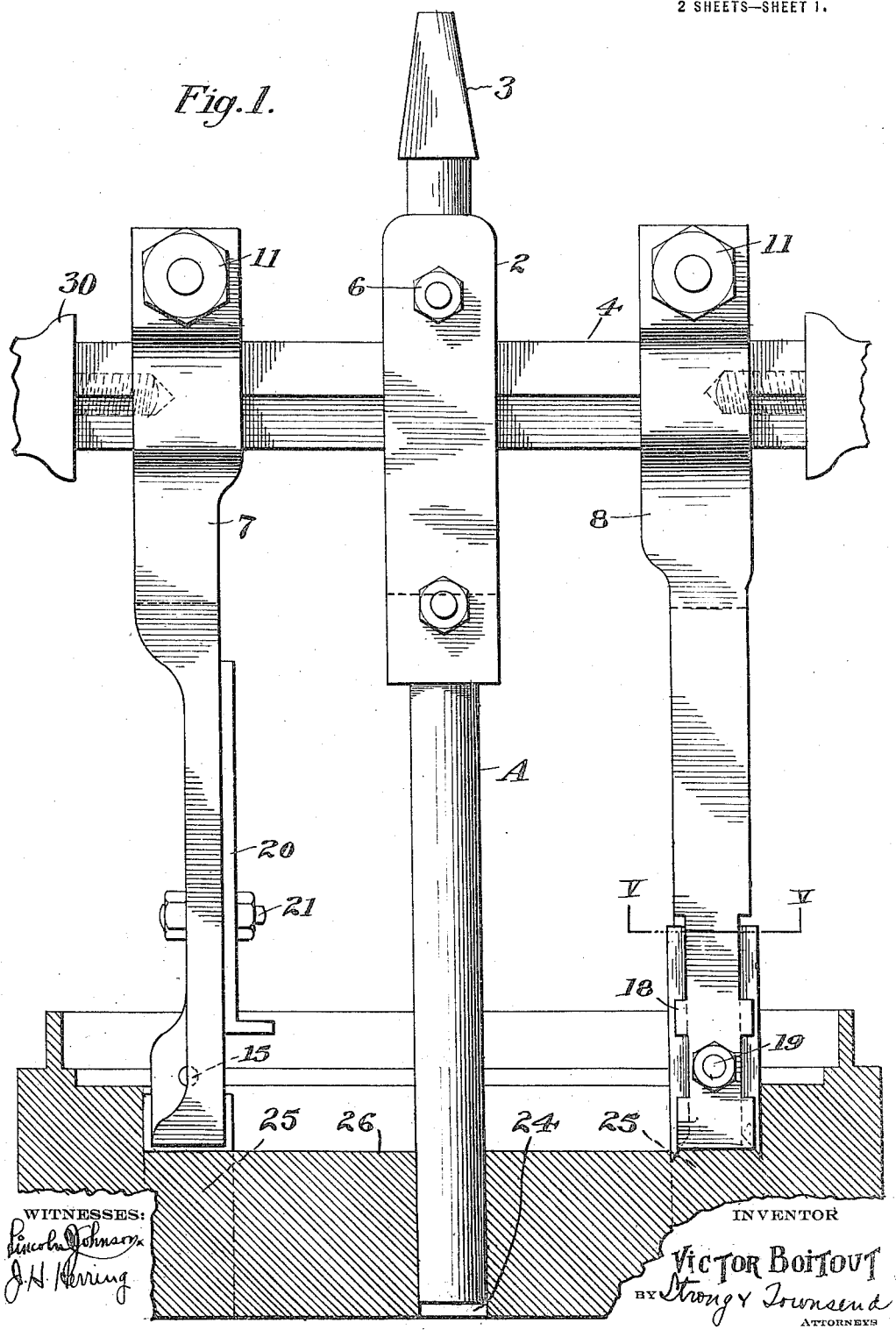

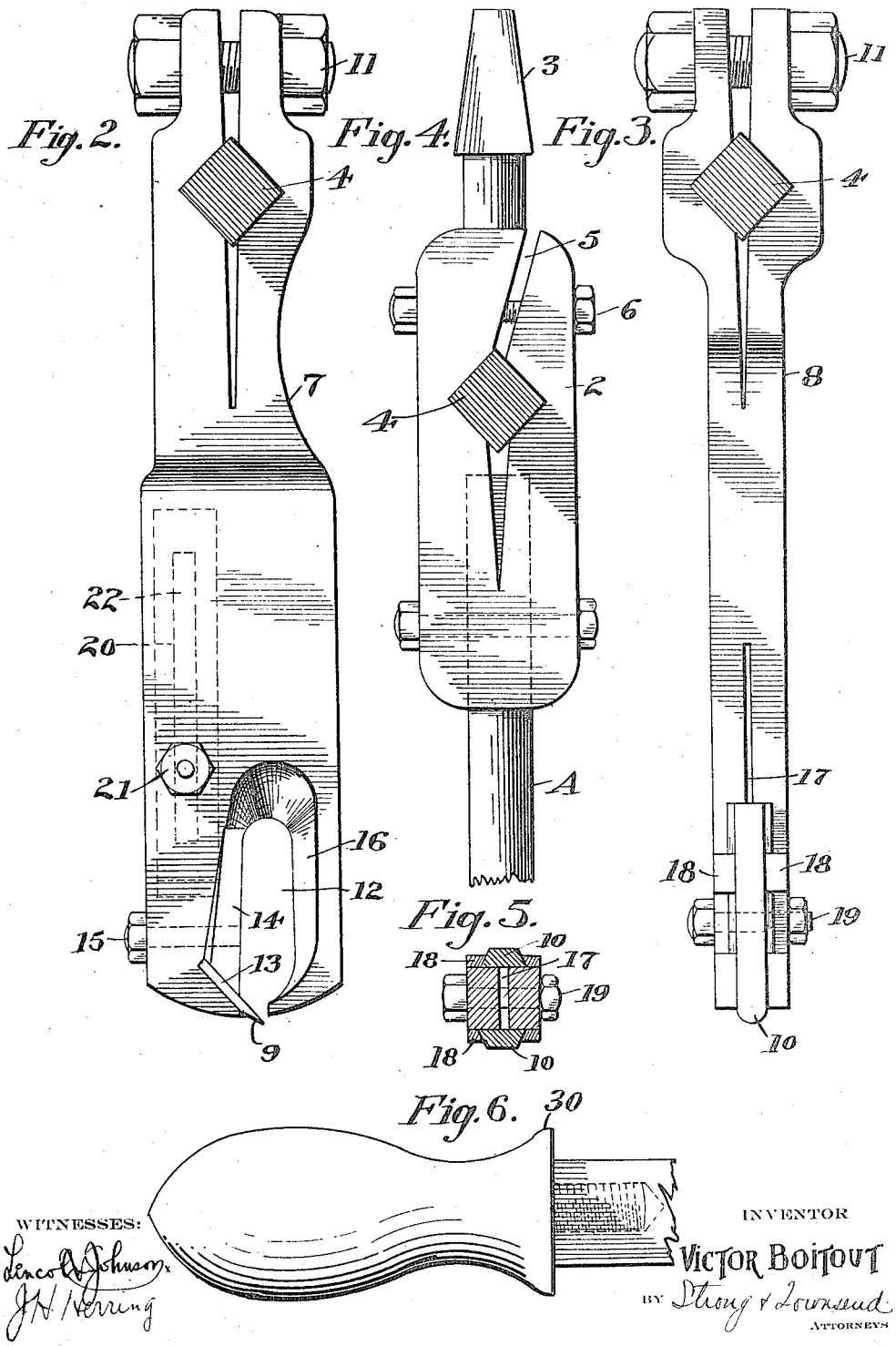

VICTOR BOITOUT, OF SAN FRANCISCO, CALIFORNIA.

CIRCULAR DADO AND MOLDING PLANE.

1,261,348.

Specification of Letters Patent.

Patented Apr. 2, 1918.

Application filed October 9, 1916. Serial No. 124,628.

*To all whom it may concern:*

Be it known that I, VICTOR BOITOUT, citizen of France, residing at the city and county of San Francisco and State of California, have invented new and useful Improvements in Circular Dado and Molding Planes, of which the following is a specification.

This invention relates to a circular dado plane.

One of the objects of the present invention is to provide a simple and substantial tool of the character described, which is particularly adapted for boring large holes or turning circular moldings and the like, in fact a tool which to a large extent can accomplish the work of an ordinary wood turning lathe.

Another object of the invention is to provide a tool such as described which may be either operated by an ordinary brace or by hand and can be quickly and easily adjusted to suit different kinds of work.

Further objects will hereinafter appear.

The invention consists of the parts and the construction and combination of parts as hereinafter more fully described and claimed, having reference to the accompanying drawing in which:—

Figure 1 is a front view of the tool.

Fig. 2 is a side elevation of the tool holder supporting the plane.

Fig. 3 is a side elevation of the tool holder carrying the double edged scarfing bit.

Fig. 4 is a side elevation partly broken away, of the center post.

Fig. 5 is an enlarged cross section on line 5—5 of Fig. 1.

Fig. 6 is a view of the handle.

Referring to the drawings in detail, A indicates a center post, 2 a clamp or holder, and 3 a shank which is adapted to be secured in the chuck of an ordinary brace or like tool. Extending through the holder 2 is a tool bar 4. This bar is preferably square in cross-section, and as the holder 2 is split as at 5 and provided with a clamping screw 6, it can readily be seen that the tool bar may be rigidly secured in the holder. Slidably mounted on each side of the tool bar is a pair of tool holders 7 and 8, the holder 7 being provided for the purpose of supporting a planing tool 9 while the holder 8 is provided to support a double edged scarfing bit 10. The upper end of each tool holder is split and adapted to embrace the tool bar, and as each holder is provided with a clamping screw 11, it can readily be seen that each holder may be adjusted laterally along the bar 4 with relation to the center post A, and when adjusted may be rigidly secured by the clamping screws 11. The lower end of the holder 7 is cut away as at 12 to form an opening through which the shavings may freely discharge while the lower end is beveled as at 13 to form a seat for the plane 9 which is secured by a clamping plate 14 and a screw 15. The side of the holder opposite plate 14 is cut away as at 16 to permit as free a discharge as possible of the shavings cut by the plane 9. The lower end of the holder 8 is split as at 17 and is provided on each side with a pair of outwardly extending dove-tailed lugs 18 between each of which is placed a scarfing bit 10, the two bits being secured by a screw 19.

Adjustably mounted on either one of the holders 7 or 8 is a depth gage 20. This gage is secured by a clamping screw 21 and as the inner face of the gage is slotted as at 22, it can readily be seen that it may be raised or lowered to permit the tool to cut to any depth desired.

In operation if it is desired to cut a comparatively large hole through a block, it is only necessary to bore a center hole such as shown at 24, Fig. 1, with an ordinary bit to receive the center post A. The coöperating cutting tools consisting of the double edged scarfing bit and the plane 9 are then adjusted laterally along the tool bar an equal distance until the desired diameter is obtained when they are secured by the clamping screws 11. The center post is then placed in the center hole 24 prepared with the ordinary bit, and a brace is then applied to the shank 3 of the holder to turn the tool as a whole. The double edged scarfing bit running ahead of the plane cuts two vertical grooves in the wood while the plane following cuts a shaving from the wood intermediate of the vertical grooves prepared by the scarfing bit. A clean annular groove is in this manner cut to any depth required, this depth being regulated by the adjustment of the depth gage 20. Of course if it is desired to cut clear through the block it is only necessary to continue down through the wood until the block is penetrated, as indicated by dotted lines 25, see Fig. 1.

The center core 26 is in this manner formed, which is removed the moment the block is cut through. A comparatively large circular opening can in this manner be cut without handling more wood than necessary, as the shape of the tools employed merely cuts an annular groove of comparatively small area. If large work is being handled and it is found that a brace can not readily be used, it is possible to apply a pair of handle extensions such as indicated at 30. The tool bar together with the center post and the holders 7 and 8 may then be turned by the handles 30. Similarly different sizes and lengths of bars 4 may be employed where the work handled requires such changes.

All shapes of circular moldings and like work can be cut with the present tool.

The materials and finish of the several parts of the tool may be such as the experience and judgment of the manufacturer may dictate.

I wish it understood that various changes in form, proportions and minor details of construction may be resorted to within the scope of the appended claims, and that I do not wish to limit myself to the specific design or construction here shown.

Having thus described my invention, what I claim and desire to secure by Letters Patent is:—

1. In a tool of the type set forth, a tool holder having a relatively wide shank with a substantially inverted U-shaped cut-out extending through its lower end to form a pair of arms, each of said arms having its lower end inclined inwardly, a plane bit seated on one of said inclined lower arms and having its cutting edge extending below the free extremity of the lower end of the other arm, and means to secure the plane bit in rigid position, the sides and top of the cut-out being flared to assist the discharge of shavings.

2. In a tool of the type set forth, a tool holder having a pair of spaced arms, said arms having their lower ends inclined and extending toward each other, a plane bit seated on said inclined lower end of one arm and having its cutting edge extending below the free end extremity of the other arm, the inclined lower end of the other arm forming a shaving deflector for the bit and confronting the latter, and means to rigidly secure the plane bit in position.

In testimony whereof I have hereunto set my hand in the presence of two subscribing witnesses.

VICTOR BOITOUT.

Witnesses:
 JOHN H. HERRING,
 H. W. HEALEY.

Copies of this patent may be obtained for five cents each, by addressing the "Commissioner of Patents, Washington, D. C."